Figure 1:
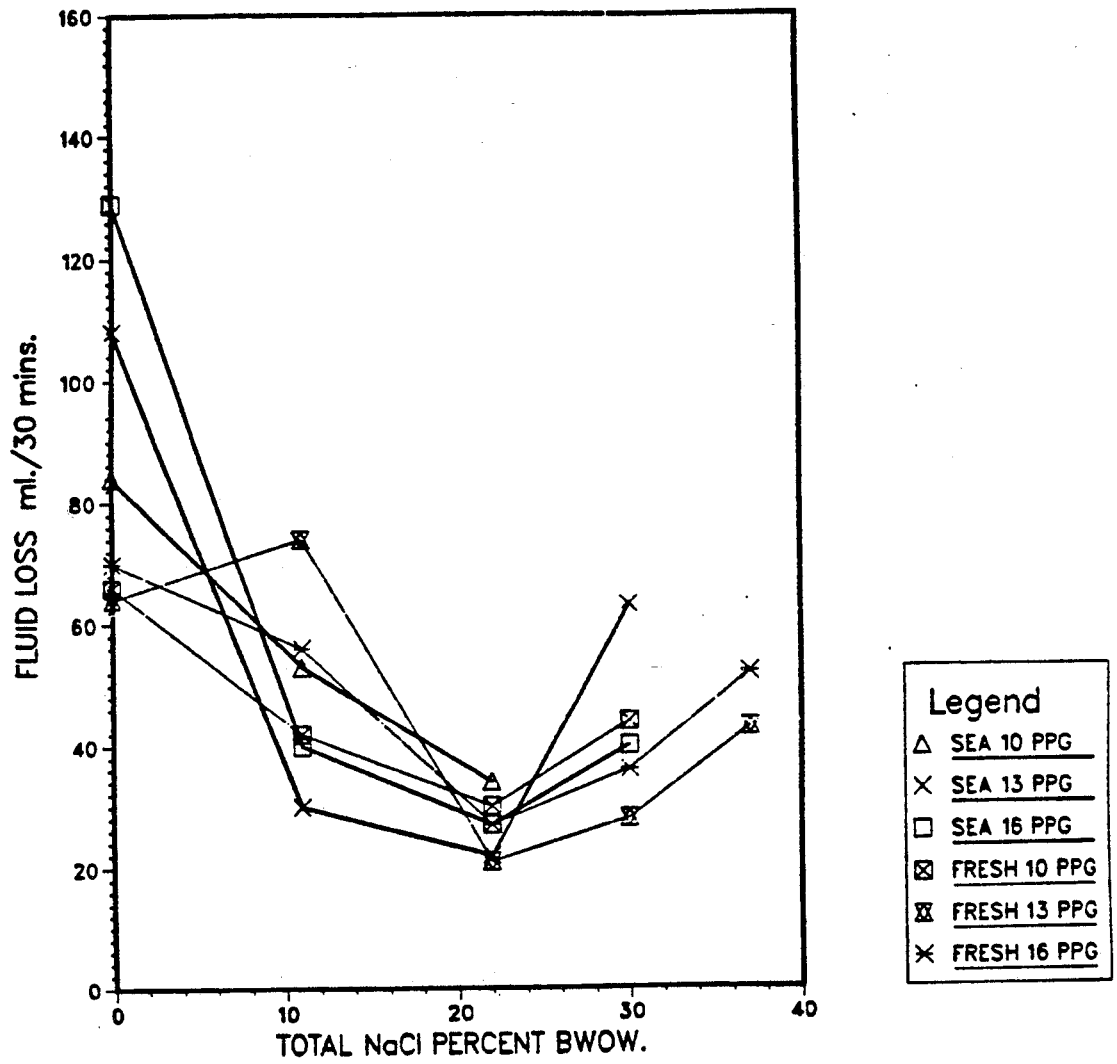

United States Patent [19]

Parcevaux et al.

[11] Patent Number: 5,101,902

[45] Date of Patent: Apr. 7, 1992

[54] AQUEOUS SPACER COMPOSITION COMPATIBLE WITH DRILLING MUDS AND CEMENT SLURRIES

[75] Inventors: Philippe Parcevaux; David B. Jennings, both of St. Etienne, France

[73] Assignee: Dowell Schlumberger Incorporated, Tulsa, Okla.

[21] Appl. No.: 391,383

[22] Filed: Aug. 9, 1989

Related U.S. Application Data

[63] Continuation of Ser. No. 244,682, Sep. 12, 1988, abandoned, which is a continuation of Ser. No. 868,361, May 28, 1986, abandoned.

[30] Foreign Application Priority Data

May 31, 1985 [FR] France .................. 85 08434

[51] Int. Cl.$^5$ ............................ E21B 33/16
[52] U.S. Cl. ................... 166/291; 252/8.551
[58] Field of Search .............. 252/8.51, 8.551; 166/292

[56] References Cited

U.S. PATENT DOCUMENTS

| | | | |
|---|---|---|---|
| 2,650,905 | 9/1953 | Fordyce et al. | 252/8.51 |
| 3,341,319 | 9/1967 | Hibbard | 71/110 |
| 3,372,749 | 3/1968 | Williams | 252/8.554 X |
| 3,915,800 | 10/1975 | Kang et al. | |
| 3,960,832 | 6/1976 | Kang et al. | 252/8.5 X |
| 3,979,303 | 9/1976 | Kang et al. | 252/8.551 X |
| 4,048,077 | 9/1977 | Engelhardt | |
| 4,276,182 | 6/1981 | Beirute | 252/8.551 |
| 4,302,341 | 11/1981 | Watson | 252/8.551 |
| 4,304,300 | 12/1981 | Watson | |
| 4,422,947 | 12/1983 | Dorsey et al. | 252/8.551 X |
| 4,439,328 | 3/1984 | Moity | 252/8.512 |
| 4,440,649 | 4/1984 | Loftin et al. | 252/8.51 |
| 4,457,372 | 7/1984 | Doster et al. | 252/8.554 X |
| 4,462,836 | 7/1984 | Baker et al. | 166/293 X |
| 4,480,693 | 11/1984 | Newlove et al. | |
| 4,507,210 | 3/1985 | Lauzon | 252/8.5 |
| 4,599,180 | 7/1986 | Vio et al. | 252/8.55 |
| 4,646,834 | 3/1987 | Bannister | 252/8.551 |
| 4,743,383 | 5/1988 | Stewart et al. | 252/8.51 |

FOREIGN PATENT DOCUMENTS 2582664 12/1986 France .

Primary Examiner—Robert L. Stoll
Assistant Examiner—Gary L. Geist
Attorney, Agent, or Firm—Stephen A. Littlefield

[57] ABSTRACT

An aqueous spacer composition, compatible with drilling muds and cement slurries including saline slurries, and application there of drilling oil and gas wells.

Preferred spacer bases in accordance with the invention comprise a biopolymer of the type produced by *Azotobacter indicus*, a high molecular weight sulfonated styrene or toluene-styrene polymer, and a dispersing agent. This base fluid has no solid particles. The final spacer composition additionally contains a weighting agent (barite) and water. Total compatibility is provided with muds and/or cement slurries whether or not they are saline, together with excellent fluid loss controlling, rheological, and anti-settling properties. A wetting agent may be added to provide compatibility with oil-based muds.

16 Claims, 3 Drawing Sheets

AQUEOUS SPACER COMPOSITION COMPATIBLE WITH DRILLING MUDS AND CEMENT SLURRIES

This application is a continuation of application Ser. No. 07/244,682 filed Sept. 12, 1988, and now abandoned, which is a continuation of application Ser. No. 06/868,361 filed May 28, 1986, and now abandoned.

The present invention relates to separator fluids used when finishing oil or other wells; the universally used term "spacer" is used hereinafter to designate such "buffer fluids".

BACKGROUND OF THE INVENTION

A spacer is a fluid used in cementing operations and it is pumped between the drilling mud and the cement slurry for replacing said mud. The spacer is essential in order to avoid coming into contact the mud and the cement slurry. This is because the mud and the slurry are chemically incompatible fluids. Further, the spacer helps displace and eliminate the mud from the well by virtue of its special rheological properties and by virtue of its properties encouraging the removal of mud from the walls of the well.

A spacer is composed form an aqueous base fluid in which a particular weighting agent is incorporated to increase the density of the fluid to a desired value, and to increase the erosion effect of the spacer on the mud cake clinging to the walls of the rocks passed through.

The aqueous base fluid must itself have several fundamental properties which are directly related to its composition: particle stability in suspension (anti-settling properties); fluid-loss control; rheology; and compatibility with muds and cement slurries.

Consequently, known spacer base fluids include at least: i) an anti-settling agent; ii) a fluid loss controlling agent; and iii) a dispersing agent.

Each of these agents may be a single product or it may be constituted by a mixture of several products.

Conversely, a single product may perform several of the above-mentioned functions.

The agents are either soluble or else dispersible in water.

Depending on the water available on site and on the geological strata encountered, the aqueous phase may be constituted by fresh water, sea water, brine, or an aqueous phase containing various proportions of dissolved salts, in particular: NaCl (0%-37%); KCL (0%-35%), $MgCl_2$ (0%-54%); $CaCl_2$ (0%-75%), on their own or in combination. It is essential that the spacer base fluid retains its properties at all possible concentration of salt(s).

Spacers are used over a temperature range running from surface temperature to the Bottom Hold Circulating Temperature (BHCT) which may reach 150° C., or very rarely 200° C. (geothermal wells).

The term "anti-settling properties" covers the capacity of the fluid to keep the particles of the weighting agent in stable suspension, and to continue doing so throughout the cementing operation, i.e. for a period of time which is 1 h to 4 h long.

Another essential property of a spacer is fluid loss control.

Fluid loss control, measured according to API standards is considered to be good if the fluid loss is less than 50×2 ml/30 min, and excellent if the fluid loss is less than 25×2 ml/30 min.

The rheology of the composition is also a determining factor.

The important rheological criteria are the flow velocity profile and the capability of providing a pressure drop and/or the capability of readily attaining turbulent flow conditions. Spacer compositions are generally designed either to have a flat velocity profile together with high pressure drops under laminar flow conditions, or else to be suitable for being pumped under turbulent flow conditions in all well configurations.

Finally, given the function of the spacer (i.e. to be pumped between the drilling mud and the cement slurry for removing and replacing said mud in the well annulus) it is absolutely essential for the spacer to be as compatible as possible both with the mud and with the slurry.

Such twofold compatibility is very difficult to obtain. One simple reason, as mentioned above, is that the mud and the slurry are naturally totally incompatible with each other.

Compatibility with the mud and with the slurry is determined by studying the increase in viscosity of a mud/spacer mixture or a cement slurry/spacer mixture varying over the range 0/100% to 100/0% by volume.

Compatibility is considered to be excellent if the viscosity of the mixture at a given shear rate is less than the viscosity of the more viscous component at the same shear rate.

Conventional spacer compositions always contain: i) an anti-settling agent which is generally bentonite or a mixture of bentonite and a cellulose derivative such as carboxymethyl cellulose (CMC); ii) a fluid loss controlling agent which is generally constituted by a hydroxypropylcellulose; and iii) a dispersing agent which is often a polynaphthalenesulfonate.

This constitutes the "base" which is thus made up from cellulose type products, bentonite (solid particles), and a dispersing agent.

The final composition of the spacer is obtained by adding a weighting agent to said base, e.g. barite, and water.

In prior known spacers, the anti-settling agent was either a particulate product such as bentonite or else a polymer such as a cellulose derivative.

However, bentonite can only be used in non-saline water, and in addition the use of bentonite spoils the viscosity by increasing it greatly. Further, bentonite is incompatible with cement which is another severe drawback.

In saline water, bentonite cannot be used and it is replaced by fibrous clays (attapulgite, sepiolite, ...), however, these materials do not give the spacer very good anti-settling properties.

The cellulose derivatives which have been used, generally serve both as an anti-settling agent and as a fluid loss controlling agent. However, carboxymethylcellulose (CMC) and hydroxyethylcellulose (HEC) are very sensitive to temperature and to salts. They function properly at low temperature and in a non-saline medium. In contrast, for work at higher temperatures the quantity of cellulose derivative that needs to be used, and thus the cost of the process, becomes prohibitive and the viscosity increases too much.

One cellulose derivative which has given very good results is hydroxypropylcellulose (HPC). However, this product is only soluble in warm water and at fairly low salt concentrations.

It can thus be seen that the prior art does not provide a spacer which is compatible both with muds and with cements, whether saline or otherwise, and which simultaneously presents good rheological, fluid loss controlling and anti-settling properties over the entire range of temperature normally encountered in oil field services.

Preferred embodiments of the present invention provide novel compositions which, when used as spacers, have two decisive advantages over known spacers:

compatibility with muds which may be saline or otherwise and/or with cements which may be saline or otherwise, regardless of the salt content of the mud and/or the cement; this is the first time that such total compatibility has been obtained in combination with the three essential properties for a spacer: good fluid loss control, good anti-settling properties, and good rheology. This satisfies a long-felt want in the oil industry; and a fluid base which is free from solid particles (unlike the bases previously known for spacers, the present base does not contain bentonite).

These surprising results are obtained by a selection of novel anti-settling agents, fluid loss controlling agents, and dispersing agents in the aqueous base.

SUMMARY OF THE INVENTION

According to the invention, this "aqueous base" for a spacer is constituted by:

i) a biopolymer selected from, scleroglucane, and the biopolymer produced by the bacterium *Azotobacter indicus* (which biopolymer is hereinafter designated as "Azotobacter", the person skilled in the art may obtain further information thereon by reference to U.S. Pat. Nos. 3,960,832, 3,915,800, and 3,979,303; and by reference to *Carbohydrate Polymers*, Volume 2, pages 276-281 (1982); 2 (1982) and to *Carbohydrate Polymers*, Volume 2, pages 276-281 (1982); FR 2 548 676 and FR 83/19594, said biopolymer acting as an anti-settling agent or rheology modifier;

ii) at least one high molecular weight anionic polyelectrolyte, as a fluid loss controlling agent; and iii) at least one low molecular weight anionic polyelectrolyte, as a dispersing agent.

Preferred high molecular weight anionic polyelectrolytes in accordance with the invention are: polystyrenesulfonates; polyvinyltoluenesulfonates; and homo-or copolymers thereof, in particular polystyrene-vinyltoluene-sulfonates, optionally copolymerized with maleic anhydride.

Preferred low molecular weight anionic polyelectrolytes in accordance with the invention are: polyacrylates; lignosulfonates and derivatives thereof; polystyrenesulfonates; polynaphthalenesulfonates; polyphosphonates; sulfonated copolymers of styrenes and maleic anhydride; copolymers of lignosulfonates and acrylic acid; and mixtures thereof.

The fluid aqueous base for a spacer which has given the best results is constituted by:

i) Azotobacher (as anti-settling agent);

ii) polystyrenesulfonate having a molecular weight of 500,000 to 10,000,000, and in particular the product "VERSA TL 600" sold by the National Adhesives and Resins Company (as fluid loss controlling agent); and iii) polystyrene-sulfonate having a molecular weight of 5,000 to 100,000, in particular the produce "VERSA TL 70" (as dispersing agent).

A variant which is even more preferred consists in replacing the above component ii) "VERSA TL 600" by "VERSA TL 6,000", which is a polyvinyltoluenesulfonate.

The invention also relates, by way of useful variant, to using a mixture in any desired proportion of VERSA TL 600 and VERSA TL 6,000 as component ii).

The three components of this base are used in the following proportions (grams of solid material per liter of water):

i) 1 to 8, and preferably 1.2 to 6; in the range 1 to 2 turbulent flow of the fluids is readily obtained, whereas in the range 5 to 8 plug flow of the fluids is readily obtained;

ii) 5 to 15, and preferably 7 to 12; and iii) 5 to 15, and preferably 7 to 12.

This base fluid for a spacer may be densified in known manner either (a) by any salt dissolved in the aqueous phase, in any proportion up to the limits of solubility, or else (b) by articulate minerals such as barite, hematite, ilmenite, silica, or galena, together with fills such as carbonates, fly ash, pozzolans, etc. . . ., or by a mixture of the materials in (a) or (b).

The density of the spacer may vary from 1.05 to 1.9 or even 2.4.

Usual additives can be added such as anti foam agents (polyglycols or polyorganosiloxanes by way of example).

Spacers in accordance with the invention may be used with cements and muds having salt concentrations anywhere in the range of 0% up to the limit of solubility of the salts (mostly NaCl, KCl, $CaCl_2$, and/or $MgCl_2$).

The compatibility of these spacers with aqueous muds based on attapulgite, bentonite, and/or polymers is excellent regardless of the concentration of salt(s) in the mud.

This is particularly true for spacers containing the Azotobacter polymer as the anti-settling agent.

For example, scleroglucan requires caution: it can only be used with highly saline attapulgite muds, since this polymer is completely incompatible with bentonite muds (the scleroglucan is absorbed on the montmorillonite).

The following tables will enable the person skilled in the art to define spacer compositions which are best suited to any given situation.

It should also be observed that spacers in accordance with the invention are just as effective with oil based muds, provided that a wetting agent is added to the spacer enabling oil-in-water emulsions to be obtained, thereby conferring good compatibility to the aqueous base of the spacer relative to the oil based mud. The wetting agent also makes it possible to leave the casing and the rock walls wettable by water after the mud has been removed. Any wetting agent capable of providing oil-in-water emulsions is suitable, regardless of whether it is non-ionic or anionic, and providing its hydrophilic-lipophilic balance (HLB) lies in the range 7 to 15. Preferred wetting agents are polyoxyethylenes with an HLB of 7 to 15, and more particularly polyethoxyl esters of $C_9$-$C_{12}$ fatty acids. A specific example is the product sold under the trademark MARCHON DC 1102 by the MARCHON-France Company.

The said spacers in accordance with the invention, whether or not they include an oil-in-water emulsifying agent have excellent compatibility with any cement composition regardless of the type of cement used, the salinity of the mixed water, the density of the slurry, or the nature of the slurry additives used (e.g. anti-foaming agent, . . . ).

The following Tables I to IV summarize tests which establish compatibility of the three selected anti-settling agents in accordance with the invention, respectively with:

Table I: saline muds
Table II: non-saline muds
Table III: saline cement slurries
Table IV: non-saline cement slurries.

In these tables, and in the following tables, "RCI" means rheological compatibility index as defined by the API (American Petroleum Institute).

RCI Calculation (API Standard)

$RCI_{xy}$ = a direct indication of the degree of thickening of the displaced fluid relative to the displacing fluid.

Examples $$RCI_{mud/spacer} = \frac{\text{highest reading at 100 r.p.m. (using a FANN viscosity meter) of mud and spacer mixtures}}{\text{reading at 100 r.p.m. for the spacer on its own}}$$

$RCI_{spacer/slurry}$ = corresponding formula

The Figure gives the formula for scleroglucan.

Guar gum and the biopolymers are well known (see French patent specifications No. 2 551 087 U.S. Pat. No. 4,154,654).

YV means: yield value
PV means: plastic viscosity
n means: flow behavior index in the well known rheological formula:

$$\tau = K\gamma^n$$

K is the consistency index.

Test conditions are indicated under each table, together with the main conclusions to be drawn from the tests.

Table V below summarizes compatibility tests of the product "VERSA TL 600" (used in accordance with the invention as a fluid loss controlling agent) with a non-saline mud and a non-saline cement slurry.

YV, PV, n and K have the same meanings as given above.

Tables VI, VII, VIII, IX, X, XI and XII below give examples of compositions in accordance with the invention together with their properties.

These examples confirm that the Azotobacter polymer gives rise to full compatibility with mud and cement regardless of the salinity thereof, and gives rise to a spacer which also has good rheology, good fluid loss controlling properties and good anti-settling properties. This combination of properties is obtained for the first time in spacer technology.

Table XIII below gives examples of spacer compositions containing different fluid loss controlling agents. TP1 and TP2 are terpolymers such as those described in U.S. Pat. No. 4 048 077, and are constituted from the following monomer fractions:

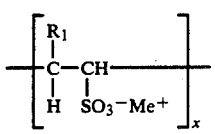

I.

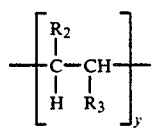

II.

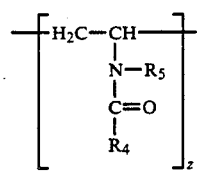

III.

in which $R_1$ and $R_2$ represent H or $CH_3$; $R_3$ represents a $CONH_2$, CN, or $COOCH_3$; $R_4$ represents H, $CH_3$ or $C_2H_5$; and $R_5$ represents $CH_3$ or $C_2H_5$, or else $R_4$ and $R_5$ together constitute a propylene group which forms a pyrrolidone radical with the NCO group. The cation for compensating the $Me^+$ is selected from $NH_4^+$, $K^+$, $Na^+$ or $Li^+$ and the parts by weight of the initial monomers, x, y, and z for the formulas I, II, and III lie respectively in the ranges 5 to 50, 25 to 92, and 3 to 70. In particular the formulas I, II and III may be constituted by:

I. : Vinylsulfonate, benzenesulfonate, styrene sulfonate, vinyltoluenesulfonate, or acrylamidomethylpropanesulfonate;
II. : acrylamide, methacrylamide, acrylic acid and salts thereof, methacrylic acid and salts thereof, methyl acrylate, and methyl methacrylate;
III. : N-vinyl-, N-methyl- or N-ethyl-formamide, acetamide or propionamide, N-vinylpyrrolidone.

Table XIII shows, unexpectedly, that two of these terpolymers, namely T1 and T2, only give mediocre fluid loss controlling results. In contrast, the VERSA TL products, and in particular VERSA TL 6,000, are excellent.

Table XIV below gives compositions of space containing various dispersing agents. The product "VISKAL TM" is "VISKAL TM Lime mud thinner" sold by the Georgia Pacific Company. It is a copolymer of acrylic acid and calcium lignosulfonate.

"VERSA TL 3" like the other VERSA products is sold by National Adhesives and Resins Ltd.

ARC 500 is a polyacrylate sold by the Coatex Company in Lyons (France).

Finally, DEQUEST 2006 is a polyphosphonate sold by Monsanto.

"NATROL 36" is a sodium salt of polycarboxylic acid.

It can be seen from this table that if reference is made to rheology and to fluid loss, the preferred base compositions for spacers are constituted by:

Azotobacter + VERSA TL 600 (and/or 6,000) + VERSA TL 70.

Finally, Table XV shows an example in accordance with the invention where the dispersing agent VERSA TL 70 has been used in combination with a polynaphthalenesulfonate. In spacers having a saline aqueous base, such as those concerned by the invention, there is a lower limit for NaCl which it is desirable to move as far away as possible so that the spacer is a little affected as possible by the presence of NaCl. The table XV composition gives an example since with only 10%

NaCl the properties are still very good, in particular the fluid loss controlling effect. In this case the lower limit for NaCl is less than 10%.

In all of the compositions in accordance with the invention, it is thus possible to replace all or a part of the dispersing agent, i.e. VERSA TL 70, by a polynaphthlene-sulfonate, and preferably by a Na or Li salt, such as sulfonate.

EXAMPLE 1

Fluid Loss Data of Turbulent Flow Spacer (See FIG. 1)

Test: API fluid loss test at 95° C. (185° F.).

Spacer: The base water is either fresh or ASTM sea water. The spacer is dissolved in the base water then the NaCl is added, then barite is added to match the required density.

Results: These examples show that the spacer can be used indifferently in fresh or sea water and consequently in any water the agressivity of which is lower or equal to that of standard sea water.

This also shows that the minimum NaCl content to be added in the base water in 10% by weight.

Finally this demonstrates that good fluid loss is obtained from density of 10 ppg (d=1.20) up to 16 ppg (d=1.92).

EXAMPLE 2

Figure 2:
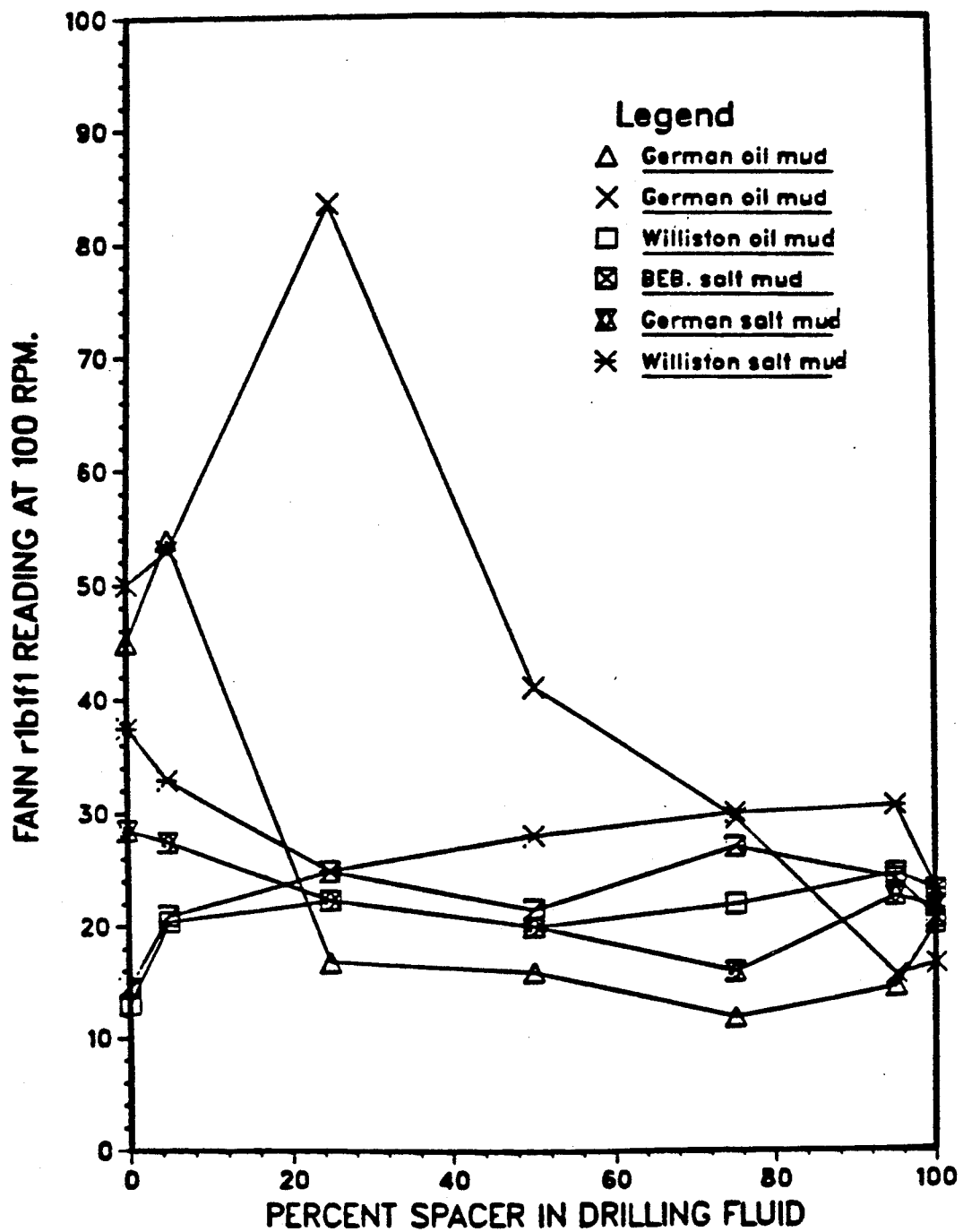

Mud compatibility of Turbulent Flow Spacer (See FIG. 2)

Test: Theology measured with FANN 35 RI BI Fl, result of the 100 RPM readings.

Fluid: The spacer is prepared in 24% NaCl water and densified to 13 ppg with barite.

It is then mixed in various proportions with 6 commercially available oil-based/salt water-based muds Results: The tests show the total compatibility of the spacer with all the above muds since there is no viscosity increase when the two fluids (spacer and mud) are mixed together. A viscosity increase would be seen in the FIG. 2 as an increase of the Fann reading.

Figure 3:
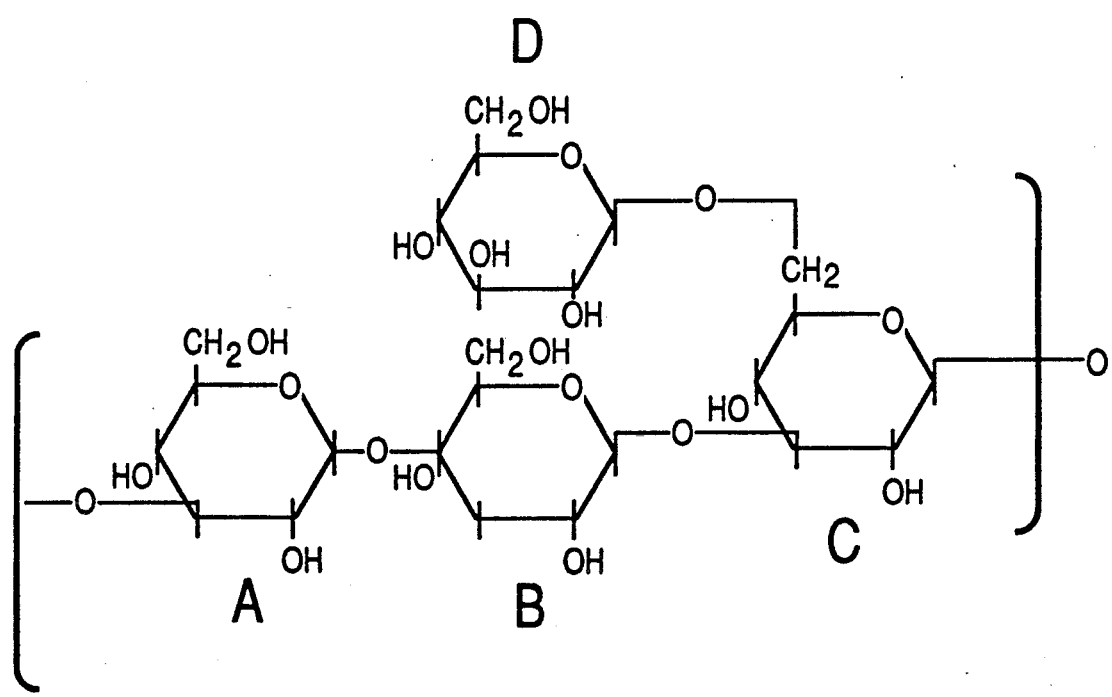

FIG. 3 illustrates the structure of scleroglucan, abbreviated SCL in the Tables below.

In order that those skilled in this technology may better understand the invention the calculation of RCI is now illustrated.

RCI Calculation (API Standard)

$RCI_{xy}$ = direct indication of the degree of thickening of the displaced fluid relative to the displacing fluid.

Examples $$RCI_{mud/spacer} = \frac{\text{higest reading at 100 r.p.m. (using a FANN viscosity meter) of mud and spacer mixtures}}{\text{reading at 100 r.p.m. for the spacer on its own}}$$

$RCI_{spacer/slurry}$ = corresponding formula

TABLE I

COMPATIBILITY WITH A SALINE MUD

| | | FANN VISCOSITY METER READINGS at (r.p.m.) | | | | | | |
|---|---|---|---|---|---|---|---|---|
| | | 600 | 100 | 3 | YV | | | K |
| POLYMER | MUD vol. % | (in $\frac{dynes}{cm^2}$) | | | $\frac{dynes}{cm^2}$ | PV cP | n | $\frac{dynes}{cm^2}$ n |
| AZO* | 100/0 | 570 | 411.7 | 162.7 | 364.6 | 25.4 | 0.17 | 177.9 |
| | 95/0 | 520 | 359 | 170 | 318.8 | 24.2 | 0.18 | 146.8 |
| | 75/25 | 402 | 244 | 136 | 198.2 | 25.5 | 0.27 | 63.0 |
| | 50/50 | 277.5 | 139 | 60 | 104.5 | 19.7 | 0.35 | 24.3 |
| | 25/75 | 232 | 124.5 | 57.5 | 100.0 | 15.0 | 0.30 | 28.4 |
| | 5/95 | 220 | 131.5 | 62.5 | 107.0 | 13.4 | 0.27 | 34.7 |
| | 0/100 | 206 | 117.5 | 45.5 | 95.3 | 12.8 | 0.28 | 29.1 |
| SCL* | 100/0 | 570 | 411.5 | 162.5 | 364.6 | 25.4 | 0.17 | 177.9 |
| | 95/5 | 416.5 | 282 | 93.5 | 241.4 | 22.0 | 0.21 | 99.7 |
| | 75/25 | 356.5 | 215 | 45.5 | 171.8 | 21.9 | 0.27 | 54.8 |
| | 50/50 | 311 | 122 | 43 | 84.6 | 25.0 | 0.45 | 13.6 |
| | 25/75 | 213 | 95.7 | 33 | 69.6 | 15.7 | 0.38 | 14.3 |
| | 5/95 | 191 | 86.2 | 36 | 70.5 | 13.8 | 0.37 | 14.9 |
| | 0/100 | 155 | 67 | 24 | 49.5 | 12.0 | 0.41 | 9.1 |

Table I (notes)
AZO* = AZOTOBACTER
SCL* = SCLEROGLUCAN

Test conditions:

spacer: a polymer solution at a concentration of 6.6 g/l (grams per liter) in a 15% NaCl solution at ambient temperature;

mud: Attapulgite at 6% per weight of water in a 15% NaCl solution weighted by barite up to a density of 1.4.

$RCI_{Azotobacter}$ = 359/117.5  3

$RCI_{Scleroglucan}$ = 282/67  4.2

TABLE II

COMPATIBILITY WITH A NON-SALINE MUD

| POLYMER | MUD vol. % | FANN VISCOSITY METER READINGS at (r.p.m.) 600 | 100 (in $\frac{dynes}{cm^2}$) | 3 | YV $\frac{dynes}{cm^2}$ | PV cP | n | K $\frac{dynes}{cm^2}$ n |
|---|---|---|---|---|---|---|---|---|
| KEL* | 100/0 | 247 | 51 | 7 | 13.4 | 24.4 | 0.79 | 0.95 |
|  | 75/25 | 273 | 110 | 14 | 39.7 | 25.3 | 0.633 | 3.35 |
|  | 50/50 | 230 | 84 | 24 | 52.7 | 19.5 | 0.521 | 6.22 |
|  | 25/75 | 145 | 71 | 60 | 60.3 | 9.6 | 0.310 | 15.8 |
|  | 0/100 | 113 | 66 | 32 | 54.5 | 6.5 | 0.268 | 17.2 |
| SCL* | 100/0 | 238 | 48 | 7 | 10.5 | 23.7 | 0.860 | 0.479 |
|  | 75/25 | 1254 | 670 | 134 | 514.7 | 87.9 | 0.387 | 89.5 |
|  | 50/50 | 584 | 235 | 62 | 150.3 | 48.2 | 0.502 | 18.19 |
|  | 25/75 | 189 | 77 | 33 | 54.6 | 14.9 | 0.441 | 8.61 |
|  | 0/100 | 97 | 62 | 29 | 54.5 | 6.0 | 0.304 | 11.50 |

KEL* = XANTHAN GUM (KELZAN XC)
SCL* = SCLEROGLUCAN
Table II (Notes)
Test conditions:
spacer: polymer solution in fresh water with 0.5% xanthan gum and 0.4% scleroglucan, by weight.
mud: bentonite mud having 9% bentonite by weight of fresh water, weighted by barite up to d = 1.4
$RCI_{Xanthan} = 1.7$
$RCI_{Scleroglucan} = 10.8$
Note: Under the same test conditions but at a concentration of 0.4% by weight, guar gum gels at a mud/gum ratio of 75/25.
Guar gum is thus an example of a polymer which is not compatible and thus not usable in a spacer.

TABLE III

COMPATIBILITY WITH A SALINE CEMENT

| POLYMER | SLURRY vol. % | FANN VISCOSITY METER READINGS at (r.p.m.) 600 | 100 (in $\frac{dynes}{cm^2}$) | 3 | YV $\frac{dynes}{cm^2}$ | PV cP | n | K $\frac{dynes}{cm^2}$ n |
|---|---|---|---|---|---|---|---|---|
| AZO* | 100/0 | 114 | 28 | 15 | 10.4 | 10.6 | 0.64 | 1.17 |
|  | 95/5 | 126 | 33 | 17 | 15.2 | 11.5 | 0.60 | 1.71 |
|  | 75/25 | 209 | 59 | 14 | 27.9 | 19.1 | 0.62 | 2.69 |
|  | 50/50 | 213 | 83 | 29 | 54.1 | 17.2 | 0.46 | 8.53 |
|  | 25/75 | 224 | 106 | 42 | 79.2 | 16.3 | 0.37 | 17.2 |
|  | 5/95 | 200 | 113 | 50 | 91.3 | 12.7 | 0.29 | 27.2 |
|  | 0/100 | 205 | 117 | 50 | 94.9 | 12.8 | 0.28 | 28.2 |
| RHO* | 100/0 | 114 | 28 | 15 | 10.4 | 10.6 | 0.64 | 1.17 |
|  | 95/5 | 100 | 28 | 11.5 | 13.5 | 8.9 | 0.57 | 1.69 |
|  | 75/25 | 129 | 37 | 14 | 17.6 | 11.6 | 0.58 | 2.05 |
|  | 50/50 | 136 | 33 | 7.6 | 5.8 | 13.5 | 0.79 | 0.53 |
|  | 25/75 | 165 | 51 | 12.5 | 24.9 | 15.1 | 0.61 | 2.40 |
|  | 5/95 | GELS |  |  |  |  |  |  |
|  | 0/100 | 161 | 85 | 36 | 69.1 | 10.4 | 0.30 | 19.45 |

Table III (Notes)
AZO* = AZOTOBACTER
RHO* = XANTHAN GUM (RHOLOPOL 23 P)
Test conditions:
spacer: a solution of polymer in a 15% BaCl solution. Polymer concentration 6.6 g/l.
Cement: DYCKERHOFF API class G cement; mix water having 15% NaCl; ambient temperature; d = 1.68.
$RCI_{Azotobacter} = 113/28 = 4.0$
The azotobacter biopolymer has very good compatibility. Xanthan gum has very bad compatibility and 25/75 (gels at rest) and no compatibility at 5/95 (gels).

TABLE IV

COMPATIBILITY WITH A NON-SALINE CEMENT

| POLYMER | SLURRY vol. % | FANN VISCOSITY METER READINGS at (r.p.m.) 600 | 100 (in $\frac{dynes}{cm^2}$) | 3 | YV $\frac{dynes}{cm^2}$ | PV cP | n | K $\frac{dynes}{cm^2}$ n |
|---|---|---|---|---|---|---|---|---|
| KEL* | 100/0 | 397 | 170 | 52 | 127.4 | 29.1 | 0.38 | 26 |
|  | 75/25 | 287 | 98 | 26 | 57.0 | 24.6 | 0.51 | 7.6 |
|  | 25/75 | 108 | 17 | 2 | 0.05 | 11.5 | 1.1 | $5 \times 10^{-2}$ |
|  | 5/95 | 81 | 35 | 10 | 26.3 | 6.1 | 0.49 | 5 |
|  | 0/100 | 69 | 35 | 11 | 27.8 | 4.7 | 0.35 | 6 |
| SCL* | 100/0 | 397 | 170 | 52 | 127.4 | 29.1 | 0.38 | 26 |
|  | 95/5 | 445 | 182 | 52 | 129.8 | 34.1 | 0.41 | 22 |
|  | 75/25 | 354 | 112 | 38 | 46.0 | 41.7 | 0.53 | 8 |

TABLE IV-continued

COMPATIBILITY WITH A NON-SALINE CEMENT

| POLYMER | SLURRY vol. % | 600 | 100 (in $\frac{dynes}{cm^2}$) | 3 | YV $\frac{dynes}{cm^2}$ | PV cP | n | K $\frac{dynes}{cm^2}$ n |
|---|---|---|---|---|---|---|---|---|
| | 50/50 | 211 | 65 | 26 | 38.8 | 18.5 | 0.56 | 4 |
| | 25/75 | 125 | 37 | 11 | 20.6 | 11.0 | 0.57 | 2.4 |
| | 5/95 | 45 | 16 | 6 | 11.0 | 3.8 | 0.49 | 1.5 |
| | 0/100 | 48 | 20 | 8 | 15.3 | 3.6 | 0.40 | 2.8 |

Table IV (Notes)
KEL* = XANTHAN GUM (KELZAN XC)
SCL* = SCLEROGLUCAN
Test conditions:
spacer: Polymer solution in fresh water with 0.3% xanthan and 0.2% scleroglucan (by weight).
cement: DYCKERHOFF "GULF" cement (tropical quality) API class g; ambient temperature; fresh mix water; d = 1.9.
$RCI_{Scleroglucan} = 182/170 = 1.1$
Note: Xanthan gum is incompatible at 25/75 (the mixture separates and settling is observed).

TABLE V

FLUID LOSS CONTROLLING AGENT VERSA TL 600
Compatibility with non-saline mud and cement slurry
(VERSA TL 600 = high molecular weight styrene polymer)

| AGT* | SLURRY or MUD POLYMER Vol. % | 600 | 100 (in $\frac{dynes}{cm^2}$) | 3 | YV $\frac{dynes}{cm^2}$ | PV cP | n | K $\frac{dynes}{cm^2}$ n |
|---|---|---|---|---|---|---|---|---|
| VER* | 100/0 | 397 | 170 | 52 | 127.4 | 29.1 | 0.38 | 26 |
| | 95/5 | 527 | 246 | 57 | 182.4 | 39.5 | 0.40 | 33 |
| | 75/25 | 294 | 110 | 38 | 62.2 | 24.9 | 0.50 | 3.4 |
| | 50/50 | 153 | 43 | 19 | 18.2 | 14.5 | 0.70 | 1.4 |
| | 25/75 | 83 | 13 | 19 | 2.4 | 8.3 | 0.87 | 0.19 |
| | 5/95 | 74 | 13 | 1 | 1.6 | 7.4 | 0.83 | 0.21 |
| | 0/100 | 142 | 37 | 2 | 16.0 | 13.6 | 0.74 | 1 |
| VER | 100/0 | 217 | 38 | 14.4 | 2.7 | 22.1 | 0.90 | 0.5 |
| | 75/25 | 364 | 91 | 12 | 35.9 | 33.0 | 0.72 | 2.3 |
| | 50/50 | 282 | 78 | 13 | 35.9 | 26.6 | 0.69 | 2.3 |
| | 25/75 | 174 | 48 | 6 | 21.1 | 16.6 | 0.72 | 1.4 |
| | 0/100 | 129 | 340 | 2 | 13.9 | 12.5 | 0.75 | 1 |

Table V (Notes)
AGT* = Fluid loss controlling agent
VER* = VERSA TL 600 (non-saline cement slurry)
VER = VERSA TL 600 (non-saline mud)
Test conditions:
cement: DYCKERHOFF API class G cement, ambient temperature, fresh mix water, d = 1.9
mud: Same composition as for Table II.
Versa TL 600: The polymer is used in a 1% by weight solution in fresh water.
$RCI_{Slurry} = 246/170 = 1.5$
$RCI_{Mud} = 364/129 = 2.7$

TABLE VI

EXAMPLES OF SPACER COMPOSITIONS IN ACCORDANCE WITH THE INVENTION:
Density variation using barite

| Temp (°C.) | % NaCl solution | Density | Sclero glucan (% BWOW) | Versa TL 70 (% BWOW) | Versa TL 6000 (% BWOW) | PV (cP) | YV $\frac{dynes}{cm^2}$ | Fluid loss: ml/30' API spec. |
|---|---|---|---|---|---|---|---|---|
| 85 | 18% | 1.2 | 0.15 | 1.0 | 0.75 | 4.5 | 14.6 | 114 |
| 85 | 18% | 1.32 | 0.15 | 1.0 | 0.75 | 6.4 | 15.9 | 38 |
| 85 | 18% | 1.56 | 0.15 | 1.0 | 0.75 | 11.0 | 19.2 | 34 |
| 85 | 18% | 1.8 | 0.15 | 1.0 | 0.75 | 18.0 | 20.8 | 38 |
| 85 | 18% | 1.92 | 0.15 | 1.0 | 0.75 | 21.7 | 22.5 | 132 |
| 85 | 18% | 2.04 | 0.15 | 1.0 | 0.75 | 29.6 | 37.5 | 146 |

The best density is clearly d = 1.56; However densities in the range 1.3 to 1.8 also give rise to good results.

TABLE VII

EXAMPLES OF SPACER COMPOSITIONS ACCORDING TO THE INVENTION:
Compatibility as a function of salinity

| Temp (°C.) | % NaCl solution | Density | Sclero glucan (% BWOW) | Versa TL 70 (% BWOW) | Versa TL 6000 (% BWOW) | PV (cP) | YV $\frac{dynes}{cm^2}$ | Fluid loss: ml/30' API spec. |
|---|---|---|---|---|---|---|---|---|
| 85 | 10% | 1.56 | 0.15 | 1.0 | 0.75 | 13.5 | 14.0 | 168 |
| 85 | 18% | 1.56 | 0.15 | 1.0 | 0.75 | 11.0 | 19.2 | 34 |
| 85 | 37% | 1.56 | 0.15 | 1.0 | 0.75 | 9.1 | 22.5 | 20 |
| 85 | sea water | 1.56 | 0.15 | 1.0 | 0.75 | 13.2 | 8.9 | 200 |

The compositions described in this table show an acceptable lower limit of NaCl concentration of about 10%.

TABLE VIII

EXAMPLES OF SPACER COMPOSITIONS ACCORDING TO THE INVENTION:
Variation in % of fluid loss controlling agent (VERSA TL 600)

| Temp (°C.) | % NaCl solution | Density | Sclero glucan (% BWOW) | Versa TL 70 (% BWOW) | Versa TL 6000 (% BWOW) | PV (cP) | YV $\frac{dynes}{cm^2}$ | Fluid loss: ml/30' API spec. |
|---|---|---|---|---|---|---|---|---|
| 85 | 18% | 2.04 | 0.15 | 2.0 | 0.75 | 26.9 | 26.3 | 164 |
| 85 | 18% | 2.04 | 0.15 | 2.0 | 1.12 | 31.5 | 29.2 | 60 |

This table shows that the lower acceptable limit for NaCl can be reduced if the proportion of fluid loss controlling agent is increased.

TABLE IX

EXAMPLES OF SPACER COMPOSITIONS IN ACCORDANCE WITH THE INVENTION:

| Temp (°C.) | % NaCl solution | Density | Sclero glucan (% BWOW) | Versa TL 70 (% BWOW) | Versa TL 6000 (% BWOW) | PV (cP) | YV $\frac{dynes}{cm^2}$ | Fluid loss: ml/30' API spec. |
|---|---|---|---|---|---|---|---|---|
| 26 | 18% | 1.8 | 0.20 | 1 | 1 | 21.3 | 21.4 | 19 |
| 85 | 18% | 2.04 | 0.15 | 1.5 | 1.5 | 35.4 | 31.5 | 108 |

TABLE X

EXAMPLES OF SPACER COMPOSITIONS IN ACCORDANCE WITH THE INVENTION:

| Temp (°C.) | % NaCl solution | Density | Polymer (% BWOW) | Versa TL 70 (% BWOW) | Versa TL 6000 (% BWOW) | PV (cP) | YV $\frac{dynes}{cm^2}$ | Fluid loss: ml/30' API spec. |
|---|---|---|---|---|---|---|---|---|
| 85 | 18% | 1.56 | sclero glucan 0.15% | 1.0 | 0.75 | 11.0 | 19.2 | 34 |
| 85 | 18% | 1.56 | xanthan XC 0.15% | 1.0 | 0.75 | 8.7 | 2.5 | 62 |
| 85 | 18% | 1.56 | Azoto bacter 0.15% | 1.0 | 0.75 | 11.7 | 14.4 | 38 |
| 85 | 18% | 1.56 | Azoto bacter 0.2% | 1.0 | 0.75 | 15.0 | 35.9 | — |

All three polymers give rise to good rheology and good fluid loss control.

TABLE XI

EXAMPLES OF SPACER COMPOSITIONS IN ACCORDANCE WITH THE INVENTION:
using the Azotobacter biopolymer

| Temp (°C.) | % NaCl solution | Density | Polymer (% BWOW) | Versa TL 70 (% BWOW) | Versa TL 6000 (% BWOW) | PV (cP) | YV $\frac{dynes}{cm^2}$ | Fluid loss: ml/30' API spec. |
|---|---|---|---|---|---|---|---|---|
| 85 | 8 | 1.56 | Azoto bacter solut. at 0.2% | 1.0 | 0.75 | — | — | 89 |
| 85 | 18 | 1.56 | Azoto bacter solut. at 0.2% + wetting agent* 47.5 l/m³ of spacer | 1.0 | 0.75 | 15.7 | 35.0 | 22 |

Table XI (Notes)
*MARCHON DC 1102: polyethoxyle acid ester of $C_9$-$C_{12}$ fatty acid
The presence of the wetting agent makes spaces in accordance with the invention compatible with oil based muds, as well.

TABLE XII

EXAMPLES OF SPACER COMPOSITIONS IN ACCORDANCE WITH THE INVENTION:
Compatibility with a saline cement Cement slurry: DYCKERHOFF "GULF" cement (tropical quality) API class G;
   poly (naphthalenesulfonate) 8.81 l/t of slurry;
   mix water having 18% NaCl: 44% by weight of cement.
spacer: Polymer at the concentration indicated in an 18% NaCl solution.
   VERSA TL 600 (fluid loss control) 0.75% by weight of water.
   VERSA TL 70 (dispersing agent) 1% BWOW.
   polyglycol 4,000 (anti-foaming agent)

TABLE XII-continued

EXAMPLES OF SPACER COMPOSITIONS IN ACCORDANCE WITH THE INVENTION:
Compatibility with a saline cement barite: in sufficient quantity to raise the density to 1.56.
test: Each fluid is mixed according to the API standards for 20 minutes at 85° C. in an atmospheric consistometer.

| POLYMER | (%) | Conc. Slurry polym. (%) | FANN reading at 3 rpm $\frac{dynes}{cm^2}$ | cP | $\frac{dynes}{cm^2}$ | $\frac{dynes}{cm^2}$ | n |
|---|---|---|---|---|---|---|---|
| — | — | 100/0 | 46 | 23.03 | 91 | 0.364 | 21 |
| Scleroglucan | | | | | | | |
| (ACTIGUM CS 11) (*) | 0.15 | 95/5 | 220 | 24.70 | 114 | 0.353 | 26 |
| (ACTIGUM CS 11) (*) | 0.15 | 75/25 | 55.5 | 12.69 | 5 | 0.781 | 0.5 |
| Xanthan gum | | | | | | | |
| KELZAN XC (**) | 0.15 | 95/5 | 320 | 23.17 | 133 | 0.308 | 36 |
| KELZAN XC (**) | 0.15 | 75/25 | 59.4 | 16.58 | 21 | 0.643 | 1.9 |
| Azotobacter | | | | | | | |
| BIOZAN (**) | 0.15 | 95/5 | 115 | 19.35 | 59 | 0.420 | 11 |
| BIOZAN (**) | 0.15 | 75/25 | 86.2 | 14.41 | 31 | 0.528 | 3.8 |

The Azotobacter polymer gives the best results for gelling resistance and plastic viscosity. This is particularly true at 95/5.
(*) Sold by CECA,
(**) Sold by KELCO.

TABLE XIII

SPACER COMPOSITIONS IN ACCORDANCE WITH THE INVENTION
Tests on various fluid loss controlling agents Spacer composition: Azotobacter: 0.2%
VERSA TL 70: 1.0%
Fluid loss controlling agent: 0.75%
Weighting barite to d = 1.56
The spacer has 18% NaCl
Test temperature: 85° C.

| Fluid loss controlling agents | FANN reading ($\frac{dynes}{cm^2}$) at r.p.m. 600 | 100 | 3 | PV cP | YV $\frac{dynes}{cm^2}$ | n | K $\frac{dynes}{cm^2}$ | n | Fluid loss in ml/30' |
|---|---|---|---|---|---|---|---|---|---|
| TP 1 | 151 | 50 | 9.5 | 14.2 | 21.0 | 0.65 | 1.74 | | 118 |
| TP 2 | 141 | 45 | 9.5 | 12.8 | 23.1 | 0.60 | 2.14 | | 124 |
| VERSA TL 500 | 129 | 43 | 9.5 | 11.8 | 20.3 | 0.61 | 1.86 | | 25 |
| VERSA TL 600 | 175 | 60 | 14 | 16.4 | 23.9 | 0.65 | 1.96 | | 31 |
| VERSA TL 6000 | 143 | 53 | 9.5 | 13.2 | 22.2 | 0.62 | 1.98 | | 20 |

TABLE XIV

SPACER COMPOSITIONS CONTAINING VARIOUS DISPERSING AGENTS spacer: Azotobacter: 0.2%
VERSA TL 600: 0.75% (except test (*) performed with VERSA TL 6000)
Dispersing agent: 1.0%
Test temperature: 85° C.
Barite up to density = 1.56
Water: 18% NaCl solution
Mud: attapulgite 6% BWOW
Weighted to d = 1.4 by means of barite.
Method: Mud compatibility is determined at a mud/spacer ratio of 75/25.
Only the spacer fluid loss is measured.

| Despersing agent | mud/cement (%) | FANN readings ($\frac{dynes}{cm^2}$) at r.p.m. 600 | 100 | 3 | PV cP | YV $\frac{dynes}{cm^2}$ | n | K $\frac{dynes}{cm^2}$ | n | Fluid loss ml/30 mn |
|---|---|---|---|---|---|---|---|---|---|---|
| VISKAL TM | 100/0 | 172 | 124 | 67 | 6.9 | 109.5 | 0.16 | 55.4 | | — |
| | 75/25 | 263 | 146 | 53 | 17.7 | 108.7 | 0.32 | 28.7 | | — |
| | 0/100 | 172 | 69 | 17 | 14.2 | 42.5 | 0.47 | 6.2 | | 43 |
| VERSA TL 3 | 75/25 | 144 | 62 | 29 | 10.8 | 44.3 | 0.40 | 8.7 | | — |
| | 0/100 | 136 | 55 | 14 | 11.1 | 34.5 | 0.47 | 5.1 | | 90 |
| CITRIC ACID | 75/25 | 218 | 115 | 67 | 14.4 | 89.0 | 0.31 | 23.8 | | — |
| | 0/100 | 129 | 50 | 12 | 10.8 | 30.5 | 0.50 | 4.0 | | 54 |
| ARC 500 | 75/25 | 222 | 134 | 81 | 12.6 | 110.9 | 0.25 | 38.9 | | — |
| | 0/100 | 127 | 50 | 12 | 10.8 | 30.5 | 0.50 | 4.0 | | 85 |
| DEQUEST 2006 | 75/25 | 187 | 96 | 55 | 12.2 | 75.9 | 0.31 | 20.5 | | — |
| (MONSANTO) | 0/100 | 122 | 48 | 12 | 10.7 | 28.2 | 0.52 | 3.4 | | 80 |
| VERSA TL 70 | 75/25 | 165 | 81 | 48 | 11.7 | 59.1 | 0.36 | 13.5 | | — |
| | 0/100 | 175 | 60 | 14 | 16.4 | 23.9 | 0.65 | 2.0 | | 31 |
| NATROL 36 | 75/25 | 179 | 86 | 40 | 12.5 | 66.1 | 0.35 | 15.6 | | — |

TABLE XIV-continued
SPACER COMPOSITIONS CONTAINING VARIOUS DISPERSING AGENTS

|  |  |  |  |  |  |  |  |  |  |
|---|---|---|---|---|---|---|---|---|---|
|  | 0/100 | 124 | 48 | 12 | 10.3 | 29.4 | 0.49 | 4.1 | 61 |
| VERSA TL 70 (*) | 75/25 | 175 | 81 | 36 | 12.9 | 58.7 | 0.38 | 12.2 | — |
|  | 0/100 | 144 | 53 | 9 | 13.2 | 22.2 | 0.62 | 2.0 | 20 |

TABLE XV
REDUCTION IN MINIMUM NaCl CONCENTRATION FOR THE SPACER COMPOSITION spacer: Azotobacter: 0.20%
VERSA TL 6000: 0.60%
Polynaphthalenesulfonate: 0.65%
VERSA TL 70: 0.50%
Test at 85° C.

| % NaCl | FANN reading ($\frac{dynes}{cm^2}$) at r.p.m. | | | PV cP | YV $\frac{dynes}{cm^2}$ | n | K $\frac{dynes}{cm^2}$ n | Fluid loss $\frac{ml}{30\ mn}$ |
|---|---|---|---|---|---|---|---|---|
|  | 600 | 100 | 3 |  |  |  |  |  |
| 10 | 153 | 55.1 | 9.6 | 14.0 | 25.3 | 0.60 | 2.4 | 39 |
| 18 | 139 | 50.3 | 7.2 | 12.8 | 21.1 | 0.64 | 1.7 | 25 |

We claim:

1. A spacer fluid for use in the drilling industry, comprising:
an aqueous base consisting essentially of a biopolymer selected from the group consisting of scleroglucan and biopolymers produced by the bacteria Azotobacher indicus as an anti-settling means, a fluid loss controlling means, a wetting agent selected from the group consisting of at least one polyethoxyl ester of a $C_9$-$C_{12}$ fatting acid a dispersing means, and a weighting means, said spacer fluid adapted for use as a spacer between a drilling mud and a cement slurry displacing fluid.

2. The spacer fluid according to claim 1, wherein the fluid loss controlling means comprises at least one high molecular weight anionic polyelectrolyte.

3. The spacer according to claim 2 wherein the anionic polyelectrolyte is a polystyrene sulfonate and/or a polyvinyltoluene sulfonate having a molecular weight in the range of 500,000 to 10,000,000 and/or copolymers thereof.

4. The spacer fluid according to claim 1, wherein the aqueous base comprises the following proportions of solid material per liter of water;
(a) from 1 to 8 grams of an anti-settling means;
(b) from 5 to 15 grams of a fluid loss controlling means; and
(c) from 5 to 15 grams of a dispersing means.

5. In a method of displacing drilling mud with a cement slurry displacing fluid in an oil well, gas well or geothermal well, the improvement comprising using a composition according to claim 4 as a spacer between said drilling mud and said cement slurry displacing fluid and the mud.

6. The spacer fluid according to claim 4, including a wetting agent.

7. The spacer fluid according to claim 6, wherein said wetting agent has a hydrophilic-lipophilic balance in the range from 7 to 15.

8. The spacer fluid according to claim 7, wherein said wetting agent comprises at least one polyoxyethylene compound.

9. The spacer fluid according to claim 1, wherein the dispersing means comprises at least one low molecular weight anionic polyelectrolyte.

10. The spacer according to claim 9, wherein the anionic polyelectrolyte is a polystyrene sulfonate having a molecular weight in the range of 5,000 to 100,000 and/or a polynaphthalene sulfonate.

11. The spacer fluid according to claim 1, wherein the base is constituted by the following proportions of solid material per liter of water;
(a) from 1.2 to 6 grams of an anti-settling means;
(b) from 7 to 12 grams of a fluid loss controlling means; and
(c) from 7 to 12 grams of a dispersing means.

12. In a method of displacing drilling mud with a cement slurry displacing fluid in an oil well, gas well or geothermal well, the improvement comprising using a composition according to claim 1 as a spacer between said drilling mud and said cement slurry displacing fluid and the mud.

13. A spacer fluid for use in the drilling industry, comprising:
an aqueous base consisting essentially of the following proportions of solid material per liter of water:
(a) from 1 to 8 grams of a biopolymer selected from the group consisting of scleroglucan and biopolymers produced by the bacteria Azotobacher indicus as an anti-settling means;
(b) from 5 to 15 grams of a polystyrene-sulfonate having a molecular weight of 500,000 to 10,000,000 as a fluid loss controlling means;
(c) from 5 to 15 grams of a polystyrene-sulfonate having a molecular weight of 5,000 to 100,000 as a dispersing means; and
(d) a weighting agent.

14. The spacer fluid set forth in claim 13, wherein said aqueous base consists essentially of the following proportions of solid material per liter of water:
(a) from 1.2 to 6 grams of biopolymer as an anti-settling means;
(b) from 7 to 12 grams of a fluid loss controlling means; and
(c) from 7 to 12 grams of a dispersing means.

15. In a method of displacing drilling mud with a cement slurry displacing fluid in an oil well, gas well or geothermal well, the improvement comprising using a composition of a low molecular weight anionic polyelectrolyte selected from a polystyrene-sulfonate having a molecular weight in the range of 5,000 to 100,000 and mixtures thereof as a spacer between said drilling mud and said cement slurry displacing fluid.

16. In a method of displacing drilling mud with a cement slurry displacing fluid in an oil well, gas well or geothermal well, the improvement comprising using a composition of at least one high molecular weight anionic polyelectrolyte selected from the group consisting of a polystyrene-sulfonate, a polyvinyltoluene-sulfonate and copolymers thereof having a molecular weight in the range of 500,000 to 10,000,000 as a spacer between said drilling mud and said cement slurry displacing fluid.

* * * * *